United States Patent
Merems (10) Patent No.: US 11,608,899 B2
(45) Date of Patent: Mar. 21, 2023

(54) METHOD OF FLOW CONTROL

(71) Applicant: Raytheon Company, Waltham, MA (US)

(72) Inventor: Paul A. Merems, Tucson, AZ (US)

(73) Assignee: RAYTHEON COMPANY, Waltham, MA (US)

(*) Notice: Subject to any disclaimer, the term of this patent is extended or adjusted under 35 U.S.C. 154(b) by 0 days.

(21) Appl. No.: 17/303,802

(22) Filed: Jun. 8, 2021

(65) Prior Publication Data

US 2022/0390017 A1  Dec. 8, 2022

(51) Int. Cl.
| | |
|---|---|
| F16K 1/12 | (2006.01) |
| F16K 1/52 | (2006.01) |
| F16K 1/38 | (2006.01) |
| F16K 1/42 | (2006.01) |

(52) U.S. Cl.
CPC .............. *F16K 1/12* (2013.01); *F16K 1/38* (2013.01); *F16K 1/422* (2013.01); *F16K 1/52* (2013.01)

(58) Field of Classification Search
CPC .................................. F16K 1/12; F16K 1/422
USPC ............................................ 251/122; 138/46
See application file for complete search history.

(56) References Cited

U.S. PATENT DOCUMENTS

| | | | |
|---|---|---|---|
| 3,043,558 A | 7/1962 | Napier | |
| 3,093,155 A | 6/1963 | Dawes | |
| 3,255,774 A | 6/1966 | Gallagher et al. | |
| 3,317,184 A * | 5/1967 | Usry | F16K 1/38 251/118 |
| 5,060,861 A | 10/1991 | Holt | |
| 5,293,902 A | 3/1994 | Lapierie | |
| 6,019,115 A | 2/2000 | Sanders | |
| 6,186,470 B1 * | 2/2001 | Officier | B67C 3/281 251/356 |
| 7,093,612 B2 * | 8/2006 | Greene | F16L 37/40 137/907 |
| 7,201,360 B2 | 4/2007 | Gaarder et al. | |
| 7,775,233 B2 | 8/2010 | Baugh | |
| 10,578,215 B2 | 3/2020 | Baumann | |
| 2004/0261437 A1 | 12/2004 | Ohno | |
| 2005/0253101 A1 * | 11/2005 | Schaupp | F16K 1/422 251/122 |
| 2007/0169817 A1 * | 7/2007 | Nigliazzo | F16K 1/422 137/198 |
| 2011/0197627 A1 * | 8/2011 | Labrie | F16K 1/54 62/529 |
| 2020/0041009 A1 * | 2/2020 | Cortiana | F16K 1/12 |

OTHER PUBLICATIONS

International Search Report and Written Opinion for PCT Application No. PCT/US2022/072624, dated Sep. 13, 2022, pp. 22.

* cited by examiner

*Primary Examiner* — Kevin F Murphy
(74) *Attorney, Agent, or Firm* — Kinney & Lange, P. A.

(57) ABSTRACT

A fitting with a body bound by an exterior surface and an interior surface. The exterior surface includes a quick disconnect profile extending from a first end of the body and an external thread extending from a second end of the body. The interior surface includes a first bore extending from the first end of the body and a second bore extending from the second end of the body. The fitting includes an orifice formed by the first bore, between a pin and the first bore, or between the pin and a third bore of an adjustment member installed within the first bore.

10 Claims, 6 Drawing Sheets

METHOD OF FLOW CONTROL

BACKGROUND

Pressured fluid systems, whether hydraulic or pneumatic, are common in many industrial environments, distributing pressured fluid from a fluid source, such as a pump, compressor, or pressurized storage vessel, to an end-use device that can include hydraulic or pneumatic motors, actuators, cylinders, rivet squeezers, rivet guns, nozzles, and sprayers, among other possible end-use devices. Downstream from the fluid source, a regulator sets fluid pressure supplied to the end-use device. Excessive fluid pressure, excessive fluid flow rate, or both can cause the end-use device to perform poorly and, in some cases, damage the tool, machine or product as well as injure an operator of the end-use device.

Attempts to prevent damage to end-use devices and mitigate operator risk include inline fixed flow devices and inline adjustable flow control valves. However, such devices are discrete from other devices, fittings, and valves within the system, increasing the number of connections within the system and, hence, increasing potential failures of the system. Further, inline fixed and adjustable flow control devices may be collocated with the operator, increasing weight and reducing the flexibility of the line connected to the end-use device, reducing operability of the device.

SUMMARY

A fitting for limiting fluid flow rate supplied to an end-use device includes a body bound by an exterior surface and an interior surface. The interior surface includes a first bore extending from a first end of the body and a second bore extending from a second end of the body, the first bore diameter being less than the second bore diameter. An exterior surface of the body includes a quick disconnect profile extending from the first end of the body and an external thread extending from the second end of the body. A pin disposed within the second bore includes a first, interior portion and a second, exterior portion between the first portion and the second end of the body. The first portion of the pin includes a profile that is rotationally symmetric about a longitudinal axis of the pin that protrudes towards the first bore. A plurality of bypass passages extends through the second portion of the pin, an outer periphery of the second portion engaging the second bore. A minimum cross-sectional area of a passage extending through the fitting coincides with the first portion of the pin.

In a further embodiment of the fitting, the second portion of the pin includes external threads engaging internal threads of the second bore and a tool interface formed by an end face of the second portion that is accessible from the second end of the body. Axial translation of the pin provided via the tool interface and external threads operate to vary the minimum cross-sectional area defined between the first portion of the pin and the first bore.

In an alternative further embodiment, the fitting includes a cylindrical adjustment member that includes external threads engaging internal threads of the first bore and a tool interface formed in an end face of the adjustment member accessible from the first end of the body. In this embodiment, the outer periphery of the pin and the second bore form a location fit or an interference fit to axially restrain the pin relative to the body. Axial translation of the adjustment member via the tool interface and external threads of the adjustment member vary a minimum cross-sectional area formed between the first portion of the pin and a third bore extending through the adjustment member.

BRIEF DESCRIPTION OF THE DRAWINGS

FIGS. 2C and 2E are end views, and FIG. 2D is a cross-sectional view of the externally adjustable variable orifice fitting.

DETAILED DESCRIPTION

As disclosed herein, a fitting equipped with a flow-limiting device simultaneously limits flow rate of fluid delivered to an end-use device while providing a quick disconnect coupling for easily attaching and detaching the end-use device from the fluid supply system. In one embodiment, the quick disconnect fitting includes a flow-limiting device formed by an orifice bore defined by a minimum diameter of the fitting extending into the fitting body. The selected diameter and length of the orifice bore is end-use specific, larger diameters required for greater flow rates and smaller diameters implemented for lesser flow rates when supplied with a given line pressure. Quick disconnect fittings with integral fixed orifices can be used for a range of line pressures supplied to the end-use devices. Alternatively, a family of fixed flow rate quick disconnect fittings can be used, each fitting tailored to deliver a particular flow rate given one of several line pressure settings. In other embodiments, the flow rate through the quick disconnect fitting can be variable by adjusting a position of a pin contained within the fitting or by adjusting the position of another element relative to a fixed pin. In both embodiments, the pin and the adjacent component, whether a bore of the fitting body or of an adjustable element, form an orifice to thereby limit flow rate of fluid discharged into the end-use device. Further, in each of the fitting embodiments described below, a single fitting performs both a flow-limiting function as well as forms a quick disconnect coupling, protecting the end-use device from damage and its operator from injury resulting from excessive fluid flow rates or fluid pressures while reducing the overall weight and improving operability of the end-use line assembly.

End-use devices can include any hydraulic or pneumatic device, or any device used to discharge pressurized fluid at a particular flow rate. Example end-use devices include rivet squeezers and rivet guns used for the manufacture of aircraft as well as hydraulic or pneumatic motors, drills, jacks, cylinders, actuators, sprayers, and nozzles among other potential hydraulic or pneumatic end-used devices.

As described below, exemplary fitting embodiments are depicted and described as male quick disconnect fittings adapted to be mated with the corresponding female quick disconnect fitting attached to the fluid system. The following embodiments reference quick disconnect fitting geometry corresponding to ISO 6150B, a spring-loaded ball-latching mechanism typical for pneumatic systems. However, other quick disconnect geometry could be used.

Figure 1A:
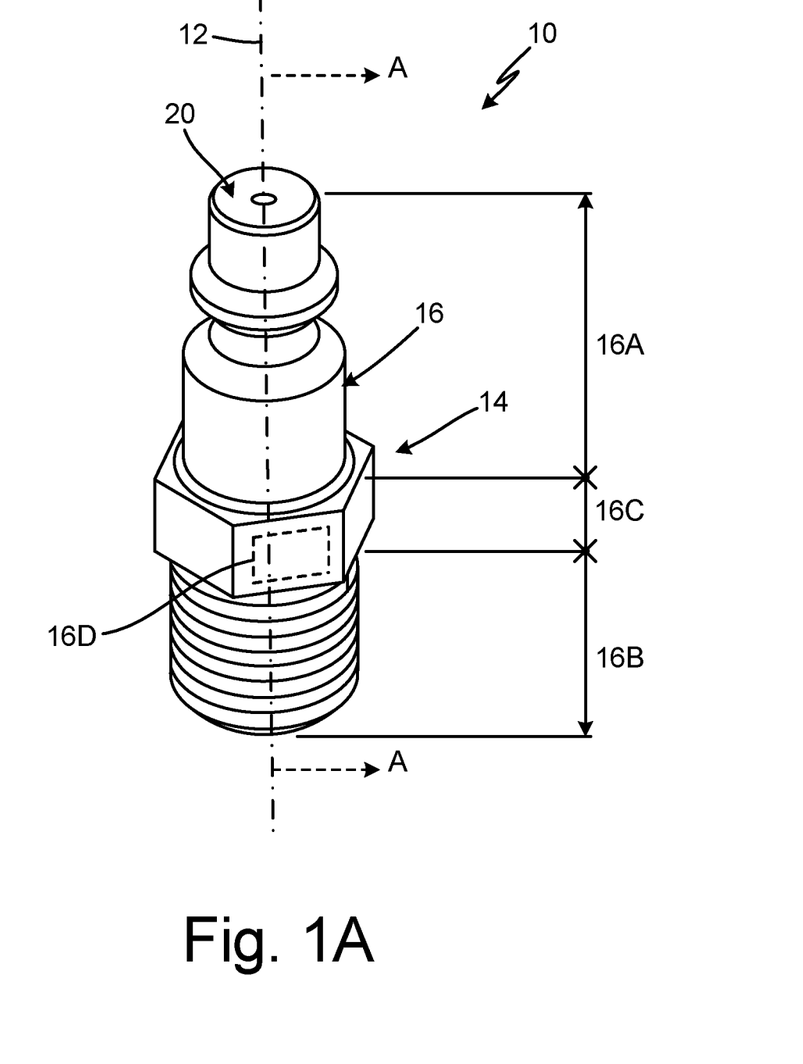
FIG. 1A is an isometric view of a quick disconnect fitting with an integral fixed orifice.
Figure 1B:
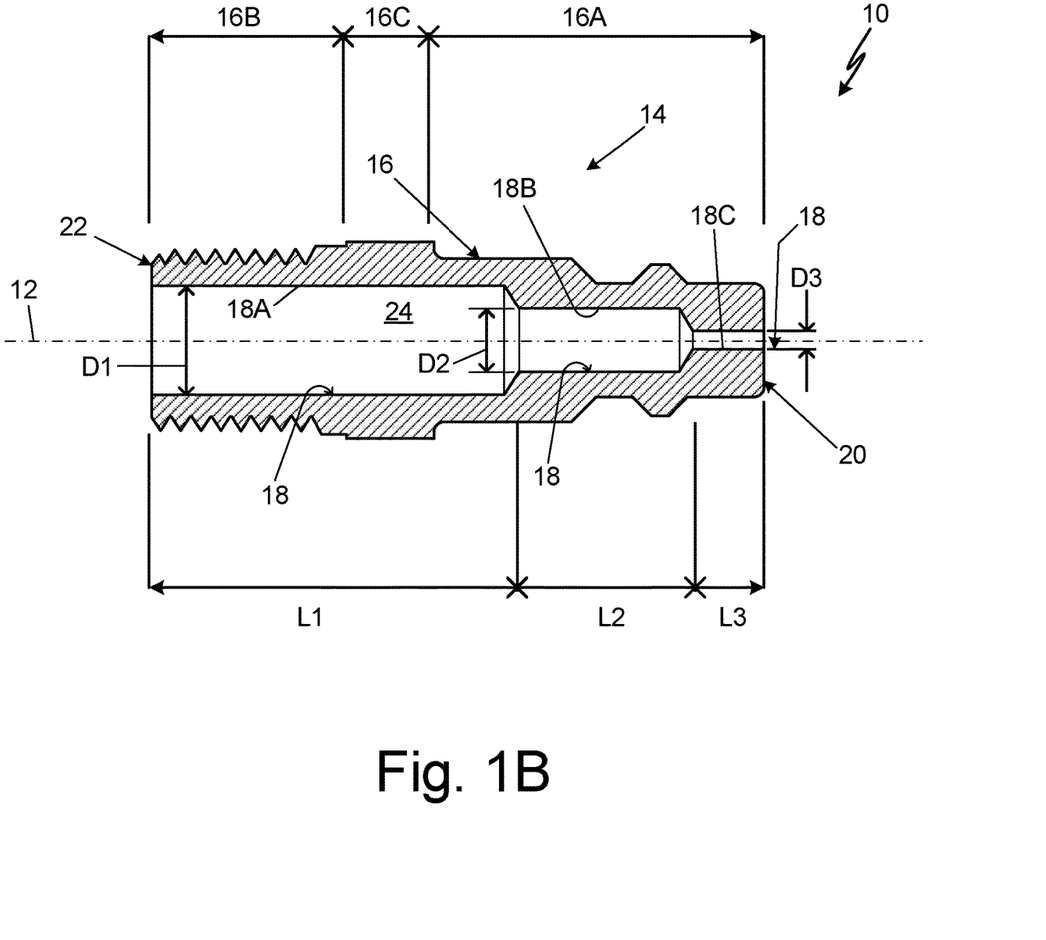
FIG. 1B is a cross-sectional view depicting interior features of the quick disconnect fitting of FIG. 1A.

FIG. 1A is an isometric exterior view of fitting 10 while FIG. 1B depicts a cross-sectional view of fitting 10 taken along line A-A which is parallel and coincident to axis 12 that defines a geometric centerline of fitting 10. Fitting 10 includes body 14 bound by exterior surface 16, interior surface 18, and end faces 20 and 22. Exterior surface 16 includes quick disconnect profile 16A extending from end face 20 as well as external thread 16B extending from end face 22 located opposite quick disconnect profile 16A. External threads 16B of fitting 10 can be formed to any suitable thread standard but is depicted in FIGS. 1A, 1B, and subsequent figures with national pipe threads (NPT) according to ANSI/ASME standard B1.20.1, which can be used to join fitting 10 to an end-use device (not shown) such as a pneumatic sprayer, rivet gun, rivet squeezer, or other pneumatic tool or device. Intermediate of quick disconnect profile 16A and external thread 16B, exterior surface 16 includes hex 16C according to metric or British standards to facilitate attachment of fitting 10 to an end-use device by using a wrench, a socket, or other similar tool. Additionally, exterior surface 16 can include marking 16D, which can be used by an operator to identify the orifice size of fitting 10.

Features of interior surface 18 include bores 18A, 18B, and 18C, each concentrically disposed about axis 12 and bounding passage 24, which extends through fitting 10 from end face 20 to end face 22. Bore 18A, bore 18B, and bore 18C have sequentially decreasing respective diameters D1, D2, and D3 as depicted by FIG. 1B. Bore 18A extends from end face 22 of fitting 10 length L1 to bore 18B, which extends length L2 from an interior end of bore 18A to bore 18C. Intermediate transitions between bore 18A and bore 18B as well as between bore 18B and 18C may be terminated with a bottom chamfer as shown. Bore 18C extends length L3 from bore 18B to end face 20 to form an orifice of fitting 10 having diameter D3, which is the minimum diameter of passage 24. For instance, diameter D3 can be between 0.010 inches (0.254 mm) and 0.080 inches (2.0320 mm) for pneumatic systems with line pressures between 100 psi and 500 psi. In some embodiments, diameter D3 can be larger or smaller to limit the fluid flow rate into end-use device for a given line pressure P, or a range of line pressures P, provided at bore 18C. In other embodiments, diameter D1 is at least three times diameter D3 and length L3 is at least three times diameter D3. Factors influencing the geometry of bores 18A and 18B (i.e., D1, L1, D2, L2) include minimizing pressure loss of fluid flowing exiting bore 18C into bore 18b as well as optimizing principle stress within fitting body 14. For instance, diameter D2 of bore 18B is less than diameter D1 of bore 18A and greater than diameter D3 of bore 18C to accommodate quick disconnect profile 16A of fitting 10. Length L2 of bore 18B resides with a region between bore 18A and bore 18C that it coincides, at least partially, with quick disconnect profile 16A to increase the cross-section of body 14 within this region and thereby reducing stress. In other embodiments, fitting 10 may not include intermediate bore 18B, the geometry of body 14 permitting bore 18A to extend from end face 22 to bore 18C.

In operation, fitting 10 connects to an end-use device at external thread 16B and connects to a system containing fluid at line pressure P via quick disconnect profile 16A. While operating the end-use device, fluid may continuously or periodically flow into end-use device through fitting 10. When fluid flows through fitting 10, the fluid flow rate delivered from the system into the end-use device is reduced primarily as a result of the pressure drop of fluid flowing through bore 18C. This flow rate reduction operates to slow down operation of the end-use device. However, when fluid does not flow through fitting 10, the pressure of fluid within fitting 10 equalizes with the pressure of fluid within the system.

Figure 2A:
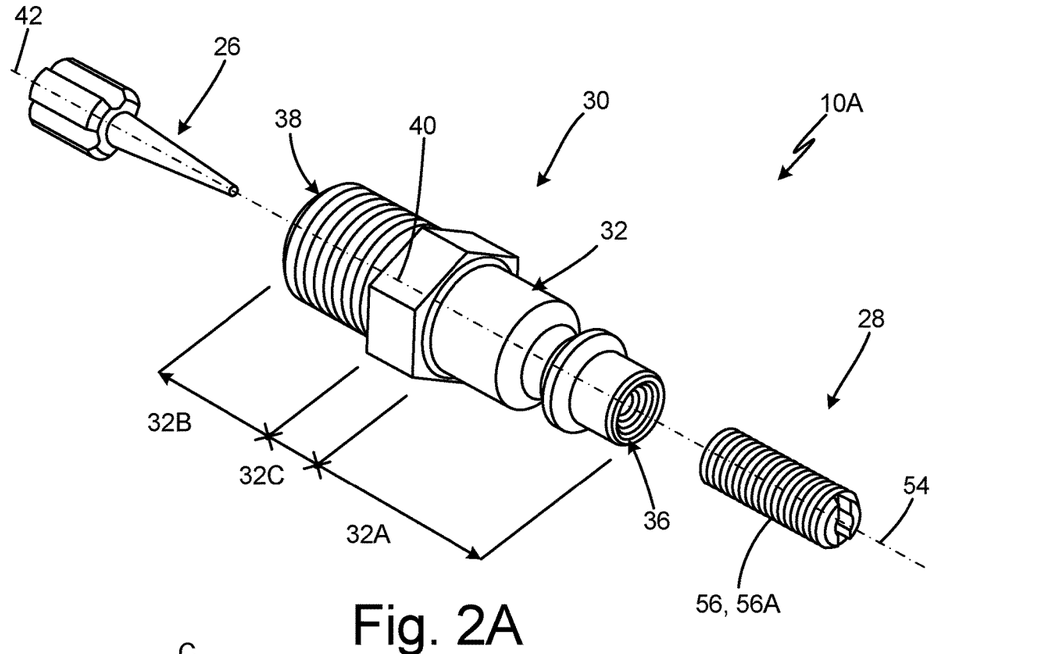
FIGS. 2A and 2B are an exploded isometric view and an assembled isometric view of an externally adjustable variable orifice fitting.
Figure 2B:
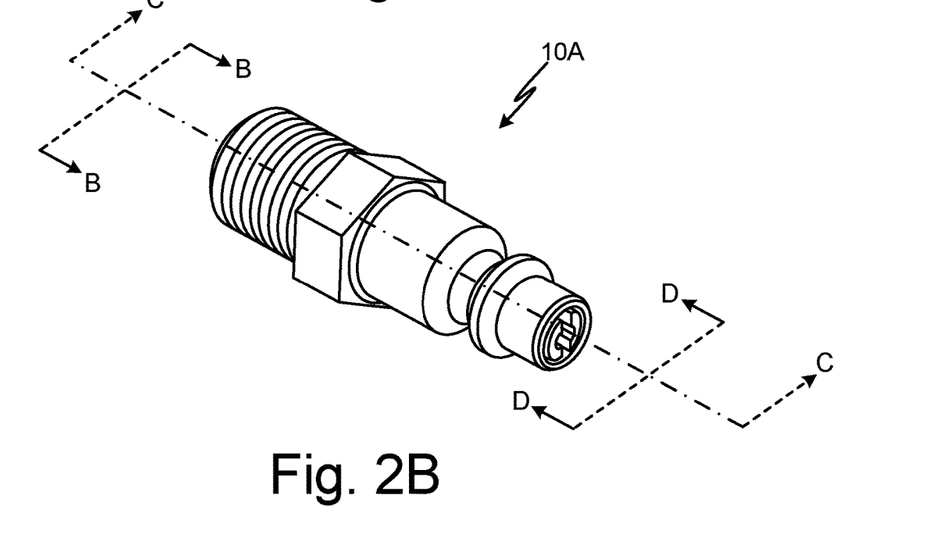
Figure 2C:
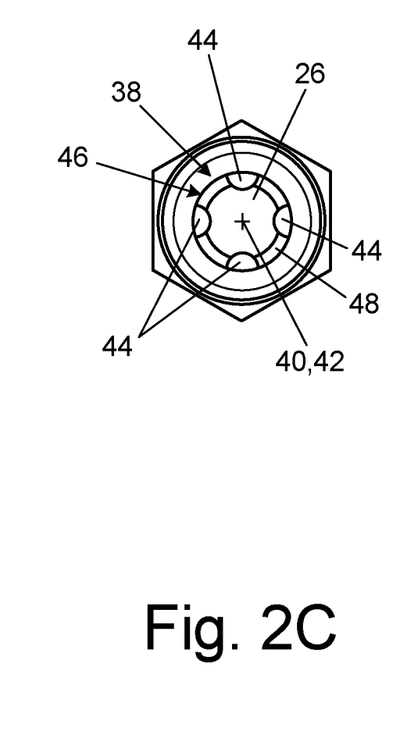
Figures 2D, 2E:
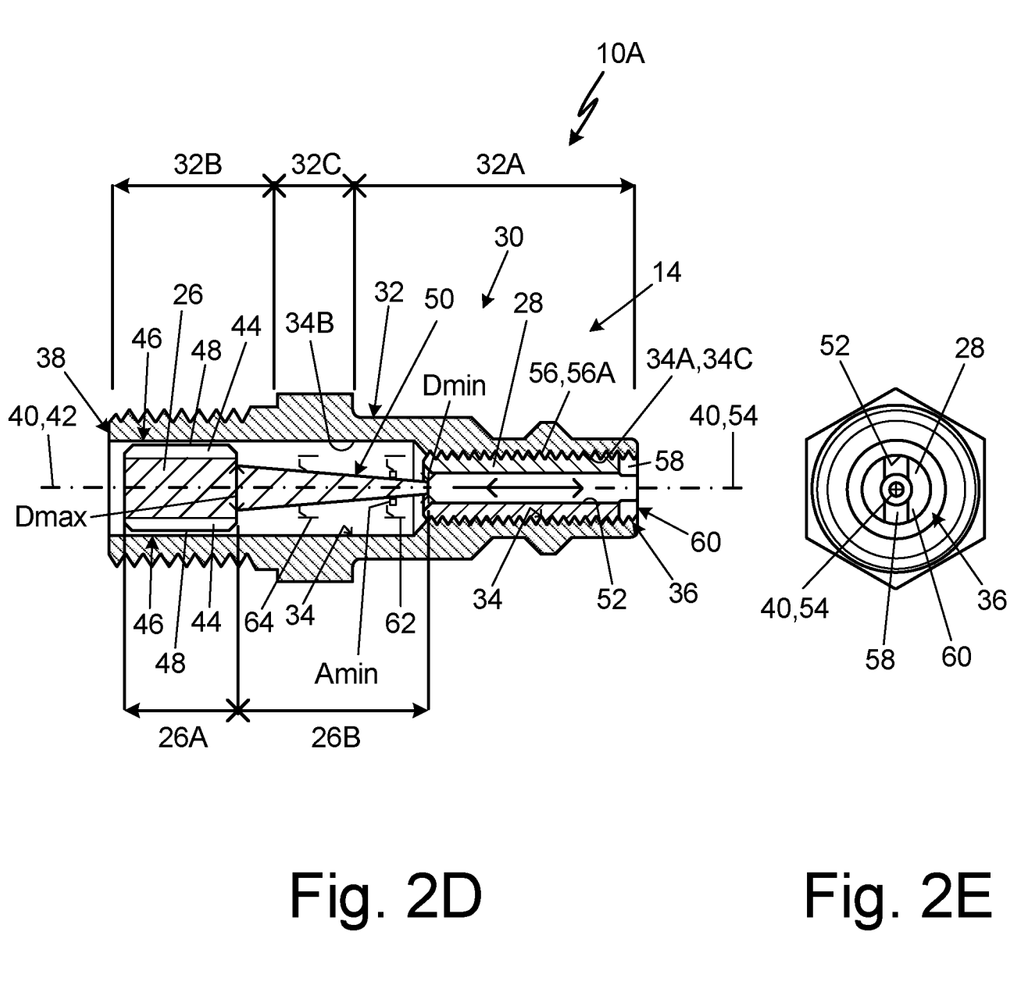

FIGS. 2A, 2B, 2C, 2D, and 2E are various views of fitting 10A within an externally adjustable orifice arrangement formed between pin 26 and adjustable member 28 assembled within body 30 of fitting 10A. FIG. 2A is an exploded view of fitting 10A in which pin 26 and adjustable member 28 are removed from body 30 of fitting 10A whereas FIG. 2B is an isometric view of fitting 10A with pin 26 and adjustable member 28 assembled within opposite ends of body 30. FIG. 2C is an end view of fitting 10A as viewed from line B-B that depicts pin 26 in an assembled position within body 30. FIG. 2D is a cross-sectional view of fitting 10A taken along line C-C while FIG. 2E is the opposite end view of fitting 10A taken from line D-D that depicts adjustable member 28 assembled in a nominal position within fitting 10A.

As shown generally in FIG. 2A and more specifically in FIG. 2D, body 30 of fitting 10A is bound by exterior surface 32, interior surface 34, and end faces 36 and 38. Exterior surface 32 includes quick disconnect profile 32A extending from end face 36 of fitting, external thread 32B extending from end face 38, and hex 32C interposed between quick disconnect profile 32A and external thread 32B, each feature formed and functioning in a manner analogous to fitting 10. Internal surface 34 includes bore 34A extending from end face 36 towards and joining with bore 34B that extends to end face 38. Bore 34A and bore 34B are concentrically disposed about axis 40 that extends through the geometric centers of bore 34A, bore 34B, end face 36, and end face 38. Bore 34A includes internal thread 34C for receiving adjustment member 28, discussed below.

In an assembled position best depicted by FIG. 2D, pin 26 is concentrically installed within bore 34B such that longitudinal axis 42 of pin 26 is coincident with axis 40 of body 30. An end of pin 26 closest to end face 38 includes support region 26A formed by a cylindrical body modified to include at least two bypass passages 44, which intersect outer peripheral surface 46 of support region 26A to form an equal number of ribs 48. Bypass passages 44 are interposed between adjacent ribs 48 and circumferentially distributed about longitudinal axis 42. As shown by FIG. 2C, pin 26 includes four bypass passages 44 and four ribs 48 equally distributed about longitudinal axis 42. However, in other embodiments, pin 26 can include three bypass passages or greater than four bypass passages 44, as flow rate and stress requirements allow. Generally, a net cross-sectional area of the bypass passages 44 is greater than the minimum cross-sectional area defined between interior region 26B of pin 26 and adjustable member 28, as discussed in greater detail below. Outer peripheral surface 46 of support region 26A can form a location fit, threaded fit, or interference fit with interior surface 18 at bore 34B that thereby restrains pin 26 axially relative to body 30.

Interior region 26B of pin 26 protrudes from support region 26A towards adjustment member 28. An outer peripheral surface of interior region 26B defines profile 50, which is rotationally symmetric about longitudinal axis 42 of pin 26. Profile 50 defines a monotonically decreasing surface extending from a maximum diameter Dmax adjacent or proximate to support region 26A to a minimum diameter Dmin at or near a tip of pin 26 distally located from support region 26A. As shown in FIG. 2D, profile 50 is frustoconical. In other embodiments, profile 50 can be entirely conical, cylindrical, concave, elliptical, or parabolic while in still other embodiments, profile 50 can be any of the foregoing shapes truncated at the distal pin tip to form an end face or can form a hybrid profile comprised of any combination of the foregoing profiles. For example, profile 50 can be conical or cylindrical adjacent to support region 26A transitioning to a concave, elliptical, or parabolic profile near the distal tip of pin 26, which may or may not be truncated to form an end face.

Additionally, profile 50 can be characterized by a slope equal to a change in diameter ΔD divided by length Lp of profile 50, or a portion of profile 50, over which the change in diameter occurs and in which length Lp is measured parallel to longitudinal axis 42. Aggressive or steep slope profiles 50 have larger diameter changes over a given length Lp than less aggressive or shallow slope profiles 50. While aggressive slope profiles provide more flow owing to a shorter length of interior region 26B overlapping with or in close proximity to adjustment member 28, aggressive slope profiles provide coarser adjustment of the minimum cross-sectional between pin 26 and adjustment member 28. By contrast, less aggressive or shallow slope profiles 50 tend to permit finer adjustment of the minimum cross-sectional area and, hence, finer adjustment of the flow through fitting 10A. However, the length of overlap between interior region 26B of pin 26 and adjustment member 28 is greater and, therefore, tends to restrict more flow relative to aggressive slope profiles 50.

Adjustment member 28 is a cylindrical body in which bore 52 extends entirely through the cylindrical body of adjustable member 28 along centrally-located axis 54. Exterior surface 56 of adjustment member 28 includes external threads 56A compatible with interior threads 34C located within bore 34A of body 30. Any suitable thread standard can be implemented for interior thread 34C and external thread 56A. Typical options include coarse (UNC), fine (UNF), and extra fine (UNEF) profiles of the unified screw thread standard as well as metric thread standard defined by ISO 68-1 and related standards. Finer thread profiles provide finer adjustment of a minimum cross-sectional area defined between pin 26 and adjustment member 28, allowing for a more precise flow adjustment setup for fitting 10A. Adjustment member 28 may include tool interface 58 formed by end face 60 of adjustment member 28, which is accessible from end face 36 of the fitting body. As shown, tool interface 58 is a slotted profile for a flat head screwdriver. However, any other type of screwdriver profile can be used as well as any socket size adapted for a hex or square driver. In yet another embodiment, tool interface 58 can be formed by bore 52 or a portion of bore 52 itself. For example, the entire length of bore 52 or a portion of bore 52 extending from end face 60 may take the form of a square or hex socket for a square or hex driver. Whichever interface is selected, tool interface 58 permits end face 60 of adjustment member 28 to be flush with end face 36 of body 30 in a normally installed position.

Rotating adjustment member 28 via tool interface 58 axially translates adjustment member 28, via external threads 56A, towards or away from interior portion 26B of pin 26 to vary a minimum cross-sectional area of fitting 10A and thereby vary a flow rate through fitting 10A. Dashed line 62 represents adjustment member 28 at a position intermediate of a nominal, maximum opening position as shown in FIG. 2D and a fully-closed position show at dashed line 64. The minimum cross-sectional area Amin of the passage through fitting 10A is represented by shaded zone depicted in FIG. 2D. However, it will be appreciated that as adjustment member 28 moves axially relative to fixed pin 26, minimum cross-sectional area Amin changes and consequently varies a flow rate delivered to end-use device. Moreover, since fitting 10A attaches to an end-use device via external thread 32B and connects to the system containing fluid at line pressure P via quick disconnect profile 32A, the flow rate through fitting 10A, as determined by varying a position of adjustment member 28, can be changed prior to or after connecting end-use device to the system via fitting 10A. In operation, fluid received from the system enters fitting 10A through bore 52 of adjustment member 28 before passing through minimum cross-sectional area defined between adjustment member 28 and interior region 26B of pin 26. Fluid passes through bypass passages 44 in support region 26A and bore 34B as it exits fitting 10A into end-use device.

Figure 3A:
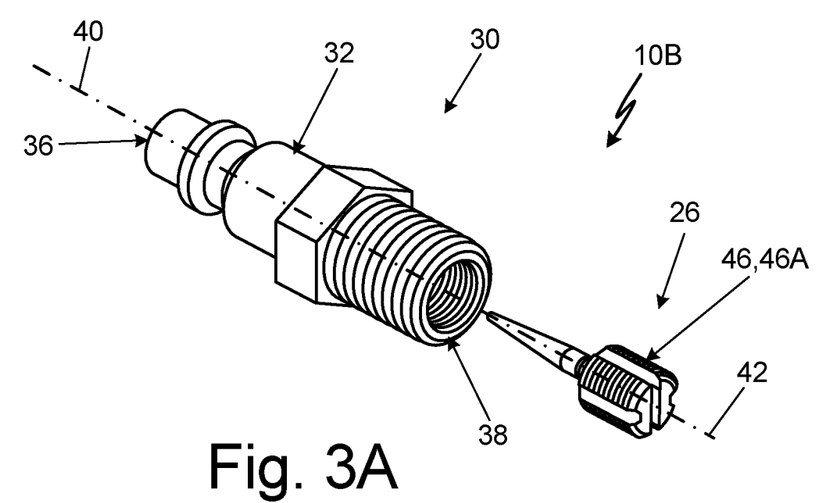
FIGS. 3A and 3B are an exploded isometric view and an assembled isometric view of an internally adjustable variable orifice fitting.
Figure 3B:
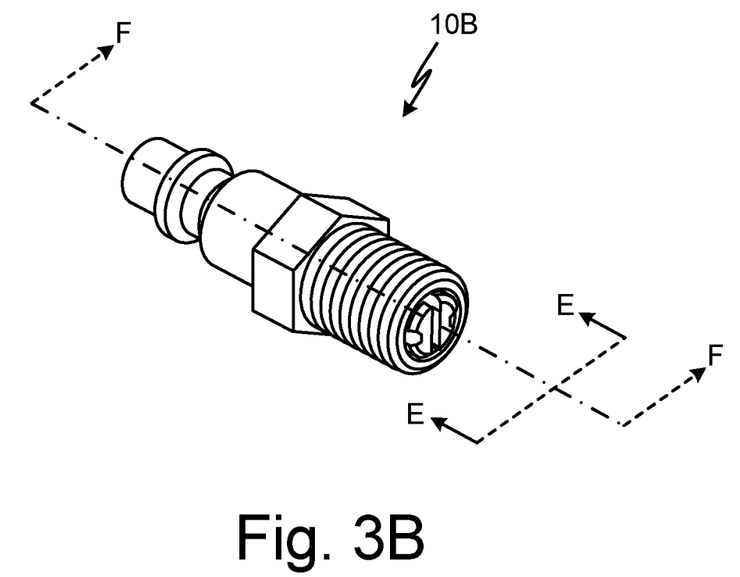
Figure 3C:
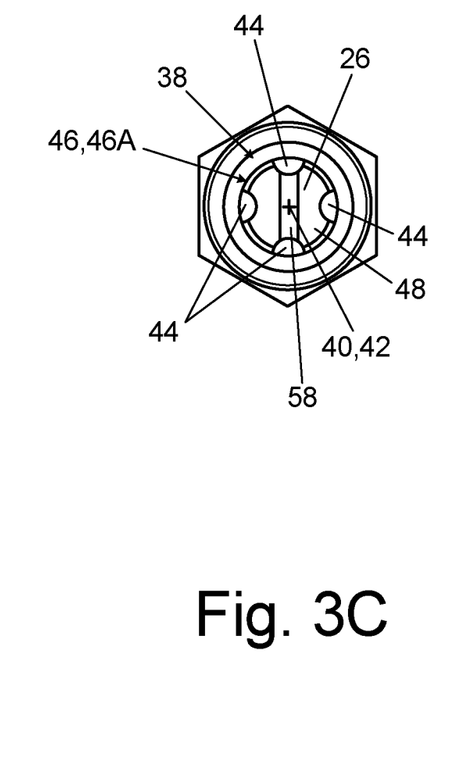
FIGS. 3C and 3D are an interior end view and a cross-sectional view of the internally adjustable variable orifice fitting.
Figure 3D:
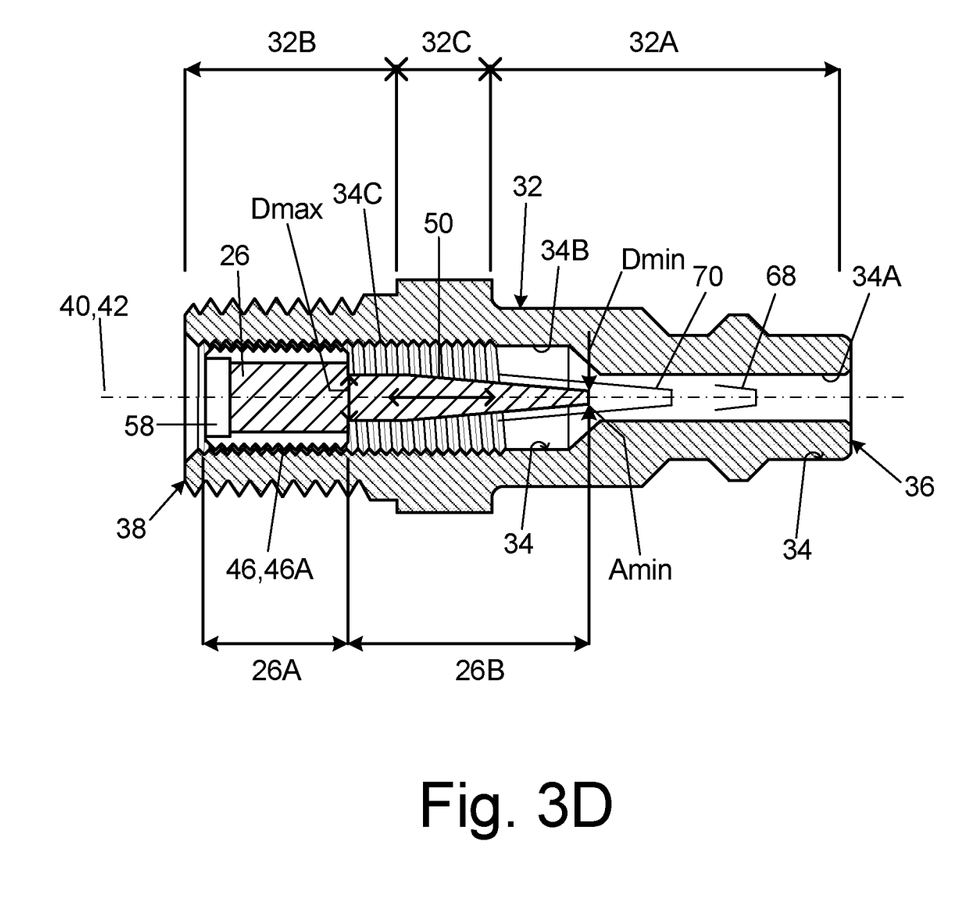

FIGS. 3A, 3B, 3C, and 3D are various views of an internally adjustable orifice arrangement formed between pin 26 and body 30 of fitting 10B. FIG. 3A is an isometric exploded view of fitting 10B showing pin 26 separated from body 30 of fitting 10B while FIG. 3B depicts pin 26 fully assembled and pin 26 in a nominal position. FIG. 3C is an end view of fitting 10B as viewed from line E-E. FIG. 3D is a cross-sectional view of fitting 10B taken along line F-F. Components and features identified with like reference numbers take a similar form and have analogous functions for fitting 10B except as described below.

Principally, fitting 10B differs from fitting 10A in that adjustment member 28 is not required, and instead, pin 26 is used to vary minimum cross-sectional area Amin of fitting 10B defined between interior region 26B of pin 26 and bore 34A of fitting body 30. In this embodiment, body 30 of fitting 10B has internal thread 34C within bore 34B that engage external thread 46A formed on peripheral outer surface 46 of pin 26. Additionally, tool interface 58 is formed by end face 66 of pin 26 closest to end face 38 of the fitting body. By rotating pin 26 using of threads 34C-46A and tool interface 58, pin 26 of fitting 10A can be positioned from the nominal, fully-open position shown by FIG. 3D to a fully-closed position indicated by dashed line 68 as well as any intermediate position represented by dashed line 70. Accordingly, minimum cross-sectional area Amin as represented by the shaded area at position 70 can vary and thereby vary a flow rate of fluid delivered to end-use device connected via external threads 32B of fitting 10B. Hence, flow-rate adjustment of fitting 10B can be accomplished only when fitting 10B is disconnect from end-use device and thereby provides assurance that a flow rate setting will remain unchanged between successive operations of end-use device.

In operation, flow enters fitting 10B from system through bore 34A and flows through minimum cross-sectional area Amin. Exiting minimum cross-sectional area Amin, fluid flows through bore 34B and through bypass passages 44 before entering end-use device connected to fitting 10B via external threads 32B.

DISCUSSION OF POSSIBLE EMBODIMENTS

The following are non-exclusive descriptions of possible embodiments of the present invention.

A fitting according to an exemplary embodiment of this disclosure, among other possible things includes a body with an exterior surface and an interior surface. The interior surface includes a first bore extending from a first end of the body and a second bore extending from a second end of the body. The exterior surface includes a quick disconnect profile extending from the first end of the body and an external thread extending from the second end of the body. The fitting includes a pin disposed within the second bore. The pin includes a first portion and a second portion. The first portion has a rotationally symmetric profile about a longitudinal axis of the pin that extends towards the first bore. The second portion is adjacent to the first portion and between the first portion and the second end of the body. An outer periphery of the second portion engages the interior surface at the second bore. A plurality of bypass passages circumferentially distributed about the longitudinal axis and extending through the second portion of the pin. The second bore and the bypass passages bound a passage extending through the fitting. A minimum cross-sectional area of the passage coincides with the first portion of the pin.

The fitting of the preceding paragraph can optionally include, additionally and/or alternatively, any one or more of the following features, configurations and/or additional components.

A further embodiment of the foregoing fitting, wherein the rotationally symmetric profile can monotonically decrease from a maximum diameter adjacent to the second portion of the pin to a minimum diameter at a distal tip of the pin.

A further embodiment of any of the foregoing fittings, wherein the rotationally symmetric profile can include an elliptical profile that coincides with the minimum diameter of the rotationally symmetric profile.

A further embodiment of any of the foregoing fittings, wherein the rotationally symmetric profile can include a parabolic profile that coincides with the minimum diameter of the rotationally symmetric profile.

A further embodiment of any of the foregoing fittings, wherein the bypass passages can intersect an outer periphery of the second portion to define a plurality of ribs, the bypass passages interposed between the ribs.

A further embodiment of any of the foregoing fittings, wherein the second portion of the pin can include external threads that engage internal threads of the second bore.

A further embodiment of any of the foregoing fittings, wherein a diameter of the first bore can be less than a diameter of the second bore.

A further embodiment of any of the foregoing fittings, wherein the first bore, the second bore, and the bypass passages can bound the passage that extends through the fitting.

A further embodiment of any of the foregoing fittings, wherein an axial extent of the first portion of the pin can at least partially coincide with an axial extent of the first bore to define the minimum cross-sectional area of the passage.

A further embodiment of any of the foregoing fittings, wherein an axial position of the pin can be variable to vary the minimum cross-sectional area of the passage defined between the first portion of the pin and the first bore.

A further embodiment of any of the foregoing fittings, wherein the pin can include a tool interface formed by an end face of the second portion accessible from the second end of the body.

A further embodiment of any of the foregoing fittings can include an adjustment member disposed within the first bore, the adjustment member comprising a cylindrical body and a third bore concentric with an outer periphery of the cylindrical body and extending through the cylindrical body.

A further embodiment of any of the foregoing fittings, wherein the outer periphery of the second portion of the pin and the first bore of the body can form a location fit or an interference fit.

A further embodiment of any of the foregoing fittings, wherein the adjustment member further can include a tool interface formed by an end face of the adjustment member accessible from the first end.

A further embodiment of any of the foregoing fittings, wherein an axial extent of the first portion of the pin can at least partially coincide with an axial extent of the third bore of the adjustment member to define a minimum cross-sectional area of the passage.

A further embodiment of any of the foregoing fittings, wherein a diameter of the third bore can be less than a diameter of the first bore.

A further embodiment of any of the foregoing fittings, wherein the outer periphery of the adjustment member can include external threads engaging internal threads of the first bore.

A further embodiment of any of the foregoing fittings, wherein an axial position of the adjustment member can be variable to vary the minimum cross-sectional area of the passage defined between the first portion of the pin and the third bore.

A fitting according to an exemplary embodiment of this disclosure, among other possible things includes a body with an exterior surface and an interior surface. The interior surface includes a first bore extending from a first end of the body and a second bore extending from a second end of the body. The exterior surface includes a quick disconnect profile extending from the first end of the body and an external thread extending from the second end of the body. The second diameter of the second bore is at least three times a first diameter of the first bore.

The fitting of the preceding paragraph can optionally include, additionally and/or alternatively, any one or more of the following features, configurations and/or additional components.

A further embodiment of the foregoing fitting, wherein the interior surface of the body can include a third bore connecting the first bore to the second bore.

A further embodiment of any of the foregoing fittings, wherein a third diameter of the third bore can be less than the second diameter and greater than the first diameter.

A further embodiment of any of the foregoing fittings, wherein the interior surface of the body can include a first tapered transition between the first bore and the third bore.

A further embodiment of any of the foregoing fittings, wherein the interior surface of the body can include a second tapered transition between the third bore and the second bore.

A further embodiment of any of the foregoing fittings, wherein a first length of the first bore can be at least three times the first diameter.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention is not limited to the particular embodiment(s) disclosed, but that the invention will include all embodiments falling within the scope of the appended claims.

The invention claimed is:

1. A fitting comprising:
a body comprising:
an interior surface that includes a first bore extending from a first end of the body and a second bore extending from a second end of the body and concentric to the first bore, wherein the first end of the body defines an inflow port coaxial with an outflow port defined by the second end of the body;
an exterior surface that includes a quick disconnect profile at the first end and an external thread at the second end; and
a passage extending through the fitting from the first end to the second end to define a longitudinally extending flow path;
a pin disposed within the second bore, the pin comprising:
a first portion having a rotationally symmetric profile about a longitudinal axis of the pin that extends towards the first bore;
a second portion adjacent to the first portion and between the first portion and the second end of the body, an outer periphery of the second portion engaging the interior surface at the second bore to axially restrain the pin relative to the body; and
a plurality of bypass passages circumferentially distributed about the longitudinal axis and extending through the second portion of the pin; and
an adjustment member disposed within the first bore, the adjustment member comprising a cylindrical body and a third bore concentric with an outer periphery of the cylindrical body and extending through the cylindrical body;
wherein the passage includes the second bore, the third bore, and the bypass passages;
wherein a minimum cross-sectional area of the passage coincides with the first portion of the pin; and
wherein an axial position of the adjustment member is variable to vary the minimum cross-sectional area of the passage defined between the first portion of the pin and the third bore.

2. The fitting of claim 1, wherein the rotationally symmetric profile monotonically decreases from a maximum diameter adjacent to the second portion of the pin to a minimum diameter at a distal tip of the pin.

3. The fitting of claim 2, wherein the rotationally symmetric profile includes an elliptical or parabolic profile that coincides with the minimum diameter of the rotationally symmetric profile.

4. The fitting of claim 1, wherein the bypass passages intersect an outer periphery of the second portion to define a plurality of ribs, the bypass passages interposed between the ribs.

5. The fitting of claim 1, wherein the second portion of the pin includes external threads that engage internal threads of the second bore.

6. The fitting of claim 1, wherein the outer periphery of the second portion of the pin and the second bore of the body form a location fit or an interference fit.

7. The fitting of claim 1, wherein the adjustment member further includes a tool interface formed by an end face of the adjustment member accessible from the first end.

8. The fitting of claim 1, wherein an axial extent of the first portion of the pin at least partially coincides with an axial extent of the third bore of the adjustment member to define a minimum cross-sectional area of the passage.

9. The fitting of claim 1, wherein a diameter of the third bore is less than a diameter of the first bore.

10. The fitting of claim 1, wherein the outer periphery of the adjustment member includes external threads engaging internal threads of the first bore.

* * * * *